L. J. BLACK.
GEARING FOR HOISTING APPARATUS.
APPLICATION FILED MAY 11, 1916.
1,229,020.
Patented June 5, 1917.
2 SHEETS—SHEET 1.
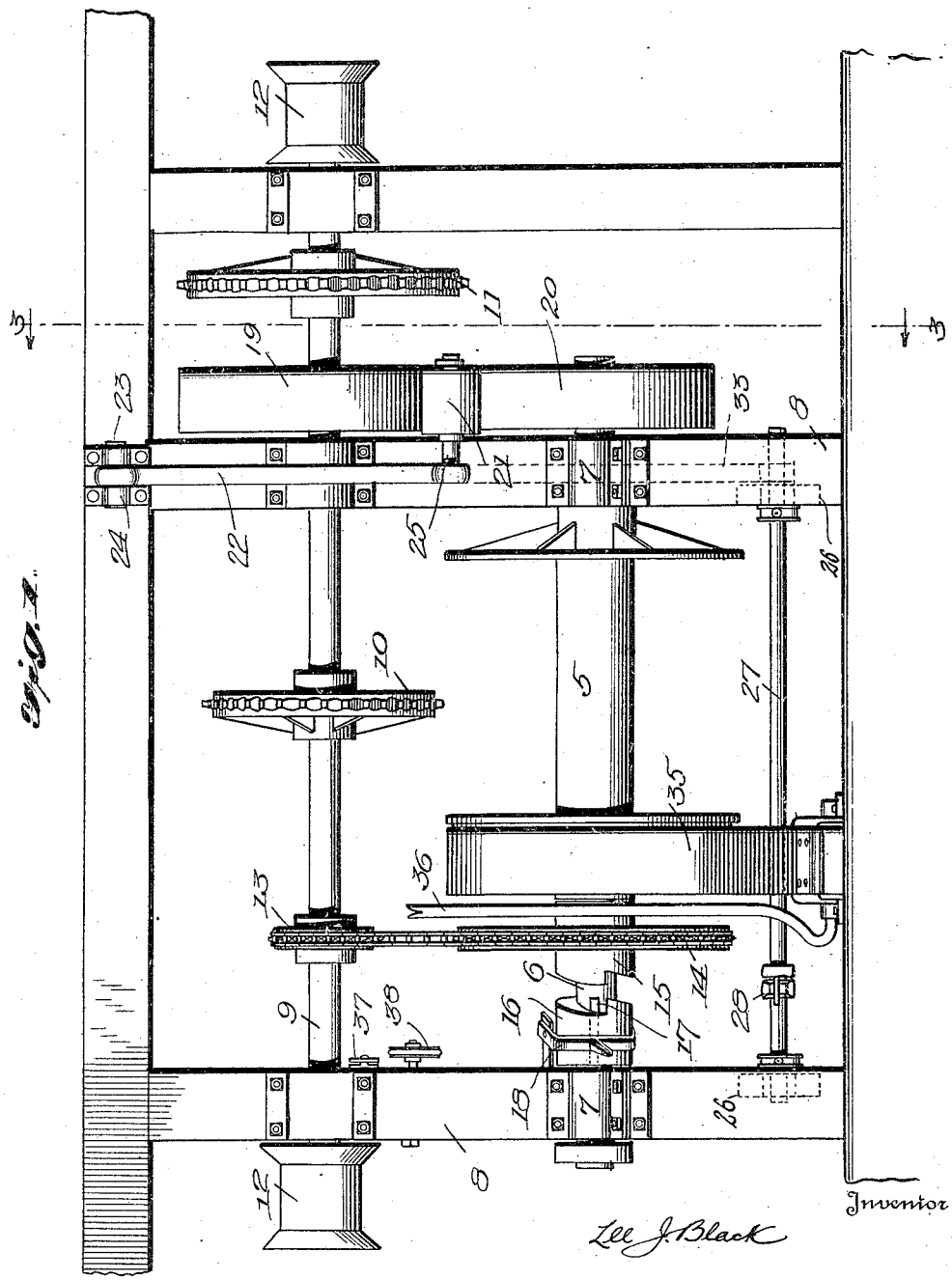

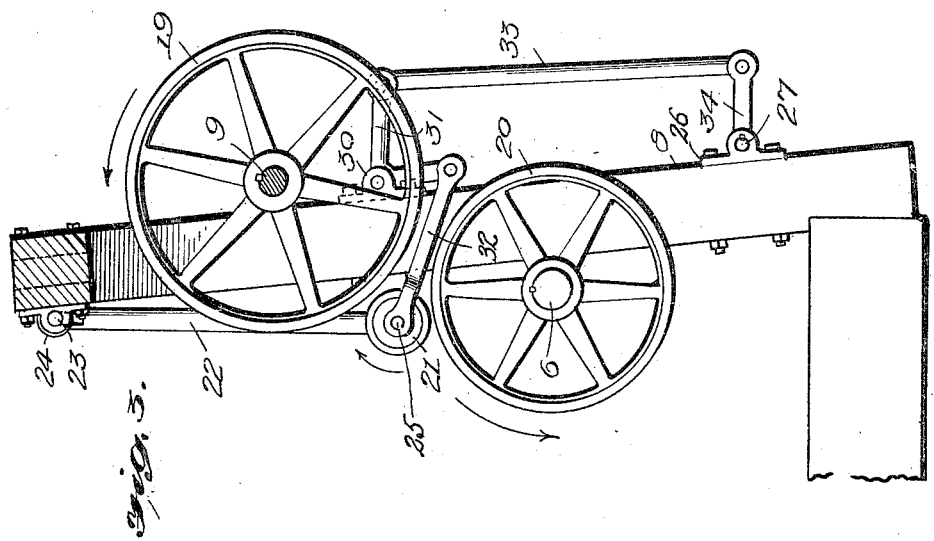
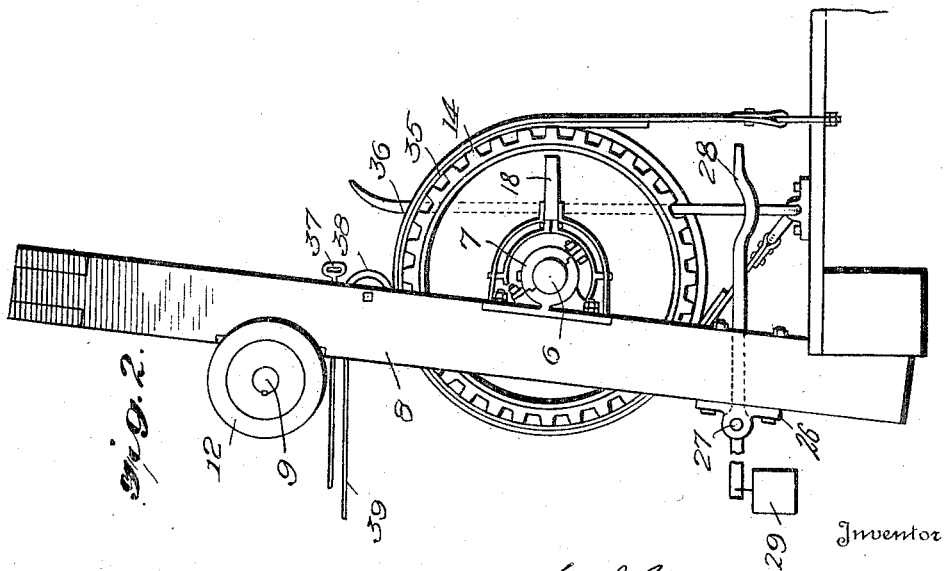

UNITED STATES PATENT OFFICE.

LEE JACKSON BLACK, OF BEAUMONT, TEXAS.

GEARING FOR HOISTING APPARATUS.

1,229,020.          Specification of Letters Patent.      Patented June 5, 1917.

Application filed May 11, 1916. Serial No. 96,819.

*To all whom it may concern:*

Be it known that I, LEE J. BLACK, a citizen of the United States, residing at Beaumont, in the county of Jefferson and State of Texas, have invented certain new and useful Improvements in Gearing for Hoisting Apparatus, of which the following is a specification.

The hoisting apparatus which is the subject-matter of the present application for patent is designed more particularly for handling or pulling drill stems or pipes from wells and for setting well casings, as well as for other operations in connection with the drilling of wells, although it is not limited to such operations but may, with equal facility, be employed for any hoisting or hauling operations.

The invention has for its object to provide a hoisting apparatus which can be easily controlled and which can be run at different speeds, the speed changes being readily effected without stopping or slowing down the apparatus, and without the operator leaving his position at the controlling devices.

With the object stated in view, the invention consists in a novel combination and arrangement of parts to be hereinafter described and claimed, and in order that the same may be better understood, reference is had to the accompanying drawings forming a part of this specification.

In the drawings—

Figure 1 is a front elevation of the apparatus;

Fig. 2 is an end view thereof, and

Fig. 3 is a vertical section on the line 3—3 of Fig. 1.

Referring specifically to the drawings, 5 denotes a drum on which the hoisting line or cable is wound. The drum is fast on a shaft 6 journaled in bearings 7 on the uprights 8 of the frame of the rig. Above the drum shaft is a line shaft 9 which is also journaled in bearings on the uprights 8. The line shaft is driven from a suitable source of power, usually a steam-engine, the latter not being shown as it forms no part of the present invention. On the line shaft are sprocket wheels 10 and 11 of different diameters, for connection with the power source, either one of said sprocket wheels being employed according to the speed desired. The ends of the line shaft are also equipped with warping heads 12.

A driving connection between the line shaft 9 and the drum shaft 6 is had by a sprocket-and-chain gear and a clutch. On the line shaft is fast a sprocket wheel 13 and in line with the latter there is loosely mounted on the drum shaft a sprocket wheel 14. These sprocket wheels are connected by a drive chain. The hub of the sprocket wheel 14 has a clutch member 15 and opposite the latter is a clutch member 16 which is slidably mounted on the drum shaft and connected thereto by a feather 17. Thus, the clutch member 16 and the drum shaft 6 turn together, and said clutch member is also free to slide along the shaft. When the two clutch members are locked together, the motion of the line shaft 9 is transmitted from the sprocket wheel 13 to the sprocket wheel 14, and through the clutch members 15 and 16 to the drum shaft 6, and as the drum 5 is fast on the latter shaft, the drum is put in motion. The clutch member 16 has a suitable operating lever 18 for shifting the same to effect its engagement with and its disengagement from the clutch member 15.

The driving means hereinbefore described impart a slow speed to the drum 5, the latter running at about one half the speed of the line shaft 9, the sprocket wheels 13 and 14 being proportioned accordingly. In order to increase the speed of the drum, an auxiliary driving means is provided, the same comprising the following parts:

Adjacent to one end of the line shaft 9, there is fast on said shaft a pulley 19, and in line therewith, a pulley 20 is fast on the drum shaft 6. Between these pulleys is located a friction wheel 21, which latter, when it is in contact with the pulleys, effects a driving connection between the shafts through said pulleys. The pulleys are proportioned so that the speed transmitted is greater than the speed transmitted by the first described driving connection, the drum turning at a greater speed than that of the line shaft.

The change from the low to the high speed can be made without slowing down and with all the power on, and also without reversing the engine or making any other move than placing the friction wheel 21 in driving contact with the pulleys 19 and 20. It will be noted that the contiguous ends of the clutch members 15 and 16 are spirally inclined, so that when the shaft 6 commences to turn faster than the shaft 9, the clutch member 16 will slide back and disengage itself automatically from the clutch member 15.

The friction wheel 21 is carried by a swinging support so that it may be placed into and out of driving position. This support is a rod 22 pivoted at its upper end on a pin 23 carried by bearings 24 mounted on one of the uprights 8. The shaft 25 of the friction wheel is carried by the lower end of the rod 22. The connection between the rod 22 and the pin 23 is a slotted one to allow the friction wheel to adjust itself to the surfaces of the pulleys 19 and 20.

On the uprights 8, near the bottom thereof, are bearings 26 supporting a horizontal rock-shaft 27 provided with a foot pedal 28 and a counterweight 29. Above this rock-shaft one of the uprights 8 has a bearing 30 supporting an angle lever 31 having one of its branches connected by a link 32 to the shaft 25 of the friction wheel 21. The other end of the lever is connected by a link 33 to a rocker arm 34 fixed on the shaft 27. By this system of lever and links, the friction wheel 21 is placed in driving contact with the pulleys 19 and 20 when the pedal 28 is depressed, and upon releasing the pedal the weight 29 operates the parts to swing the friction wheel clear of the pulleys into inoperative position, the latter being its normal position.

The drum 5 is provided with a band brake 35 as usual, having an actuating lever 36.

At 37 is shown a rod which is connected to the reversing gear of the engine, and at 38 is shown a hand wheel for the line 39 running back to the engine and connected to the throttle. These parts are supported by the upright 8 opposite the end of the rig carrying the friction wheel 21. The pedal 28, the brake lever 36, and the clutch lever 18 are all at the same end of the rig carrying the engine controlling devices, so that the entire operation can be controlled by the driller without moving from his usual position at the drum 5.

The drum is very readily controlled, the brake lever 36 being operated with the right hand, the clutch lever 18 with one leg, and the pedal 28 with one foot. In actual practice, the operation is as follows:

The driller first turns the hand wheel 38 giving the engine steam and putting the rig in motion. Then he throws the clutch lever 18 to engage the clutch members 15 and 16, and with the right hand he holds the brake lever 36. If, after starting the load, the pulling speed is to be increased, the driller puts his foot on the pedal 28 to engage the friction wheel 21 with the pulleys 19 and 20, whereupon the increased speed of the shaft 6 automatically disengages the clutch members, leaving the load on the friction end of the drum. The driller now still has his right hand free to use the brake lever to sustain the load at any point, with his left hand free to control the speed of the engine by the hand wheel 38. The change of speed is effected without jars or jerks as when a clutch mechanism is used for this purpose. With a clutch mechanism for speed changes, when running at a high speed or under a heavy load, the clutch jaws are frequently broken off, allowing the load to drop.

I claim:

1. The combination of a driven shaft, clutch members on the driven shaft, one of said clutch members having a sliding and a driving connection with the shaft, and the other clutch member being loose on the shaft, a driving shaft, a driving connection between the driving shaft and the last-mentioned clutch member, and means for transmitting motion to the driven shaft at a higher rate of speed than the motion of the driving shaft, said means comprising pulleys on the driven shaft and the driving shaft, a friction wheel engageable with the pulleys, and means for controlling the friction wheel, the clutch members having co-operating parts to disengage said members when the driven shaft rotates at a higher rate of speed than the driving shaft.

2. The combination of a driven shaft, clutch members on the driven shaft, one of said clutch members having a sliding and a driving connection with the shaft, and the other clutch member being loose on the shaft, a driving shaft, a driving connection between the driving shaft and the last-mentioned clutch member, and means for transmitting motion to the driven shaft at a higher rate of speed than the motion of the driving shaft, said means comprising pulleys on the driven shaft and the driving shaft, a friction wheel engageable with the pulleys, and means for controlling the friction wheel, the contiguous portions of the clutch members being inclined to effect an automatic disengagement when the driven shaft rotates at a higher rate of speed than the driving shaft.

3. The combination of a driven shaft, a driving shaft, main and auxiliary driving connections between the shafts, the auxiliary driving connection imparting to the driven shaft a speed greater than the speed of the driving shaft, and clutch members included in the main driving connection, one of said clutch members having a sliding and a driving connection with the driven shaft, the contiguous portions of the clutch members being inclined to effect an automatic disengagement when the driven shaft rotates at a higher rate of speed than the driving shaft.

4. The combination of a driven shaft, clutch members on said shaft, one of the clutch members having a sliding and a driving connection with the shaft, and the other clutch member being loose on the shaft, a driving shaft, a driving connection between the driving shaft and the last-mentioned clutch member, and means for transmitting motion to the driven shaft at a higher rate of speed than the motion of the driving shaft, the clutch members having coöperating parts to disengage said members when the driven shaft rotates at a higher rate of speed than the driving shaft.

5. The combination of a driven shaft, clutch members on said shaft, one of the clutch members having a sliding and a driving connection with the shaft, and the other clutch member being loose on the shaft, a driving shaft, a driving connection between the driving shaft and the last-mentioned clutch member, and means for transmitting motion to the driven shaft at a higher rate of speed than the motion of the driving shaft, the contiguous portions of the clutch members being inclined to effect an automatic disengagement when the driven shaft rotates at a higher rate of speed than the driving shaft.

6. The combination of a driven shaft, a driving shaft, main and auxiliary driving connections between the shafts, the auxiliary driving connection imparting to the driven shaft a speed greater than the speed of the driving shaft, and clutch members included in the main driving connection, one of said clutch members having a sliding and a driving connection with the driven shaft, and said clutch members having coöperating parts to disengage said members when the driven shaft rotates at a higher rate of speed than the driving shaft.

In testimony whereof I affix my signature in the presence of two witnesses.

LEE JACKSON BLACK.

Witnesses:
WILLIAM G. ALLEN,
C. H. SAUNDERS.

Copies of this patent may be obtained for five cents each, by addressing the "Commissioner of Patents, Washington, D. C."